United States Patent
Spangler et al.

(10) Patent No.: US 10,054,055 B2
(45) Date of Patent: Aug. 21, 2018

(54) SERPENTINE PLATFORM COOLING STRUCTURES

(71) Applicant: United Technologies Corporation, Hartford, CT (US)

(72) Inventors: Brandon W. Spangler, Vernon, CT (US); Edward F. Pietraszkiewicz, Southington, CT (US)

(73) Assignee: United Technology Corporation, Farmington, CT (US)

( * ) Notice: Subject to any disclaimer, the term of this patent is extended or adjusted under 35 U.S.C. 154(b) by 358 days.

(21) Appl. No.: 14/946,279

(22) Filed: Nov. 19, 2015

(65) Prior Publication Data

US 2017/0145923 A1 May 25, 2017

(51) Int. Cl.
*F02C 7/18* (2006.01)
*F01D 5/08* (2006.01)
*F01D 5/18* (2006.01)

(52) U.S. Cl.
CPC .............. *F02C 7/18* (2013.01); *F01D 5/08* (2013.01); *F01D 5/18* (2013.01)

(58) Field of Classification Search
CPC ..... F02C 7/18; F01D 5/18; F01D 5/08; F01D 5/186; F01D 5/187; F01D 5/085; F05D 2260/205; F05D 2260/22141; F05D 2260/204; F05D 2260/202; F05D 2240/81; F05D 2230/232
See application file for complete search history.

(56) References Cited

U.S. PATENT DOCUMENTS

| | | | | |
|---|---|---|---|---|
| 6,017,189 A * | 1/2000 | Judet | ...................... | F01D 5/081 416/193 A |
| 6,120,249 A * | 9/2000 | Hultgren | .................. | F01D 5/187 416/193 A |
| 6,644,920 B2 * | 11/2003 | Beeck | ...................... | B23H 9/10 204/212 |
| 7,131,817 B2 * | 11/2006 | Keith | ..................... | F01D 5/081 416/97 R |
| 7,416,391 B2 * | 8/2008 | Veltre | ..................... | F01D 5/187 416/193 A |
| 8,096,767 B1 * | 1/2012 | Liang | ..................... | F01D 5/187 415/115 |
| 8,356,978 B2 * | 1/2013 | Beattie | ...................... | F01D 5/18 415/115 |
| 8,444,381 B2 * | 5/2013 | Seely | ..................... | F01D 5/082 415/1 |

(Continued)

*Primary Examiner* — Dwayne J White
*Assistant Examiner* — Adam W Brown
(74) *Attorney, Agent, or Firm* — Snell & Wilmer L.L.P.

(57) ABSTRACT

A platform is disclosed. The platform may include an airfoil section with a cooling passage and a platform. The platform may have various cooling features, such as a platform cooling apparatus. The platform cooling apparatus may have a cooling passage forming a channel disposed at least partially through the platform and the platform cooling apparatus may have an inflow channel in fluidic communication with the channel and the cooling passage so that cooling air may travel from the cooling cavity of the blade airfoil section and into the platform cooling apparatus. Moreover, the platform cooling apparatus may have a cooling cover apparatus at least partially fluidically sealing the platform cooling apparatus.

17 Claims, 10 Drawing Sheets

(56) References Cited

U.S. PATENT DOCUMENTS

| | | | | |
|---|---|---|---|---|
| 8,794,921 B2* | 8/2014 | Ellis | ............... | F01D 5/087 29/525 |
| 2006/0269409 A1* | 11/2006 | Torii | ............... | F01D 5/187 416/97 R |
| 2015/0110641 A1* | 4/2015 | Herzlinger | ............ | F01D 5/186 416/97 R |

* cited by examiner

SERPENTINE PLATFORM COOLING STRUCTURES

FIELD

The present disclosure relates generally to cooling structures for gas turbine engines, and more specifically, to a serpentine platform cooling structure.

BACKGROUND

In a gas turbine engine, airfoil platforms are frequently cooled to ameliorate thermal mechanical fatigue that may occur. For example, thermal fight between a relatively hotter and thinner airfoil platform and a relatively cooler and thicker airfoil may cause early wear and/or failure.

SUMMARY

A platform is disclosed. The platform may include a platform cooling apparatus. The platform cooling apparatus may include a cooling passage having a channel disposed at least partially through the platform and configured to conduct cooling air, wherein the cooling passage includes a serpentine portion having a first plurality of folded channels with at least one turn, and a cooling cover apparatus at least partially fluidically sealing the platform cooling apparatus.

In various embodiments, the platform cooling apparatus further includes an inflow channel configured to receive the cooling air from a cooling cavity of an airfoil section and convey it to the cooling passage. In various embodiments, the platform cooling apparatus further includes heat transfer enhancement features disposed within the cooling passage.

In various embodiments, the folded channels are parallel folded channels and the at least one turn is a 180-degree turn.

In various embodiments, the platform cooling apparatus further includes an outflow aperture including an orifice extending in fluidic communication between the cooling passage of the platform cooling apparatus and through at least a portion of the platform and in fluidic communication with a surrounding ambient environment immediately proximate to a surface of the rotor blade.

In various embodiments, the platform includes a rib disposed between the folded channels.

In various embodiments, the cooling passage further includes a terminal portion with an end of the cooling passage forming a terminus of the cooling passage.

In various embodiments, the platform cooling apparatus further includes outflow apertures disposed through the terminal portion of the cooling passage and connecting the cooling passage in fluidic communication with a surrounding ambient environment immediately proximate to a surface of the platform.

In various embodiments, the platform cooling apparatus further includes a defined gap forming an opening between the cooling cover apparatus and the platform whereby the cooling air may escape from the cooling passage.

In various embodiments, a retention mechanism retains the cooling cover apparatus in mechanical communication with the platform proximate to the platform cooling apparatus. The retention mechanism may include an integral formation having an integral joining of the cooling cover apparatus to the platform.

The cooling cover apparatus may also include a cover plate having a plate structure disposed radially inward of the platform cooling apparatus and configured to at least partially fluidically seal the platform cooling apparatus.

In various embodiments, the retention mechanism comprises a weld. The weld may be a perimeter weld including welding extending around all edges of the cover plate. The weld may be a platform edge weld including welding extending along a single edge of the cover plate. The weld may be a rib weld including welding extending along the rib of the platform cooling apparatus and joining the rib to the cover plate.

A rotor blade is disclosed. The rotor blade may have a blade airfoil section including a cooling cavity, and a platform. The platform may include a platform cooling apparatus and a cooling cover apparatus. The platform cooling apparatus may include a cooling passage including a channel disposed at least partially through the platform and including an inflow channel in fluidic communication with the cooling cavity and the cooling passage. The cooling cover apparatus may at least partially fluidically seal the platform cooling apparatus.

In various embodiments, the platform further includes heat transfer enhancement features disposed within the cooling passage.

In various embodiments, the cooling passage further includes an outflow aperture including an orifice extending in fluidic communication between the cooling passage of the platform cooling apparatus and through at least a portion of the platform and in fluidic communication with a surrounding ambient environment immediately proximate to a surface of the rotor blade.

A method of forming a platform is disclosed. The method may include forming a platform cooling apparatus including a cooling passage comprising a channel disposed at least partially through the platform and configured to conduct cooling air, wherein the cooling passage includes a serpentine portion including a first plurality of folded channels including at least one turn, forming a cooling cover apparatus at least partially fluidically sealing the platform cooling apparatus.

BRIEF DESCRIPTION OF THE DRAWINGS

The subject matter of the present disclosure is particularly pointed out and distinctly claimed in the concluding portion of the specification. A more complete understanding of the present disclosure, however, is best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice embodiments of the disclosure, it should be understood that other embodiments may be realized and that logical changes and adaptations in design and construction may be made in accordance with this invention and the teachings herein. Thus, the detailed description herein is presented for purposes of illustration only and not limitation. The scope of the disclosure is defined by the appended claims. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Furthermore, any reference to singular includes plural embodiments, and any reference to more than one component or step may include a singular embodiment or step. Surface shading lines may be used throughout the figures to denote different parts but not necessarily to denote the same or different materials.

As used herein, including throughout the Figures, "pressure side" (PS) of an airfoil means the side of the airfoil having a shorter length and/or proximate to slower moving fluid and/or fluid at higher pressure as compared to the "suction side" of the airfoil. "Suction side" (SS) of an airfoil means the side of the airfoil having a longer length and/or proximate to faster moving fluid and/or fluid at a lower pressure as compared to the "pressure side" of the airfoil. Pointing or oriented "outward" means having a vector component extending at least partially outward, such as oriented to direct cooling air at least partially outward. Pointing "inward" means having a vector component extending at least partially inward, such as oriented to direct cooling air at least partially inward. Similarly, as used herein a "first direction" and a "second direction" comprise directions having a vector component extending at least partially in opposite directions, such as wherein the statement pointing in a "first direction" means having a vector component extending at least partially opposite the "second direction."

Figure 1:
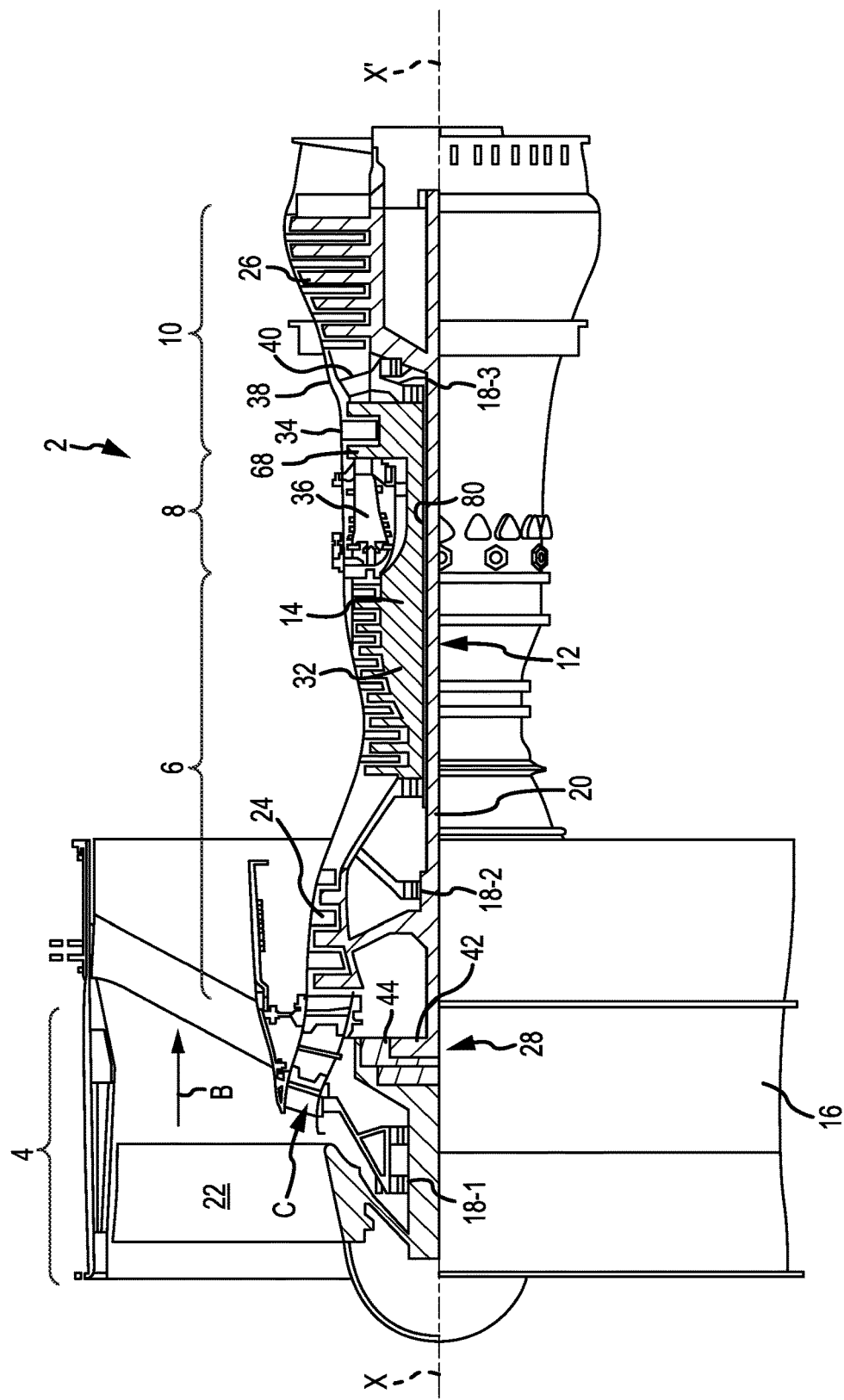
FIG. 1 illustrates a cross-sectional view of an exemplary gas turbine engine, according to various embodiments.
Figure 2A:
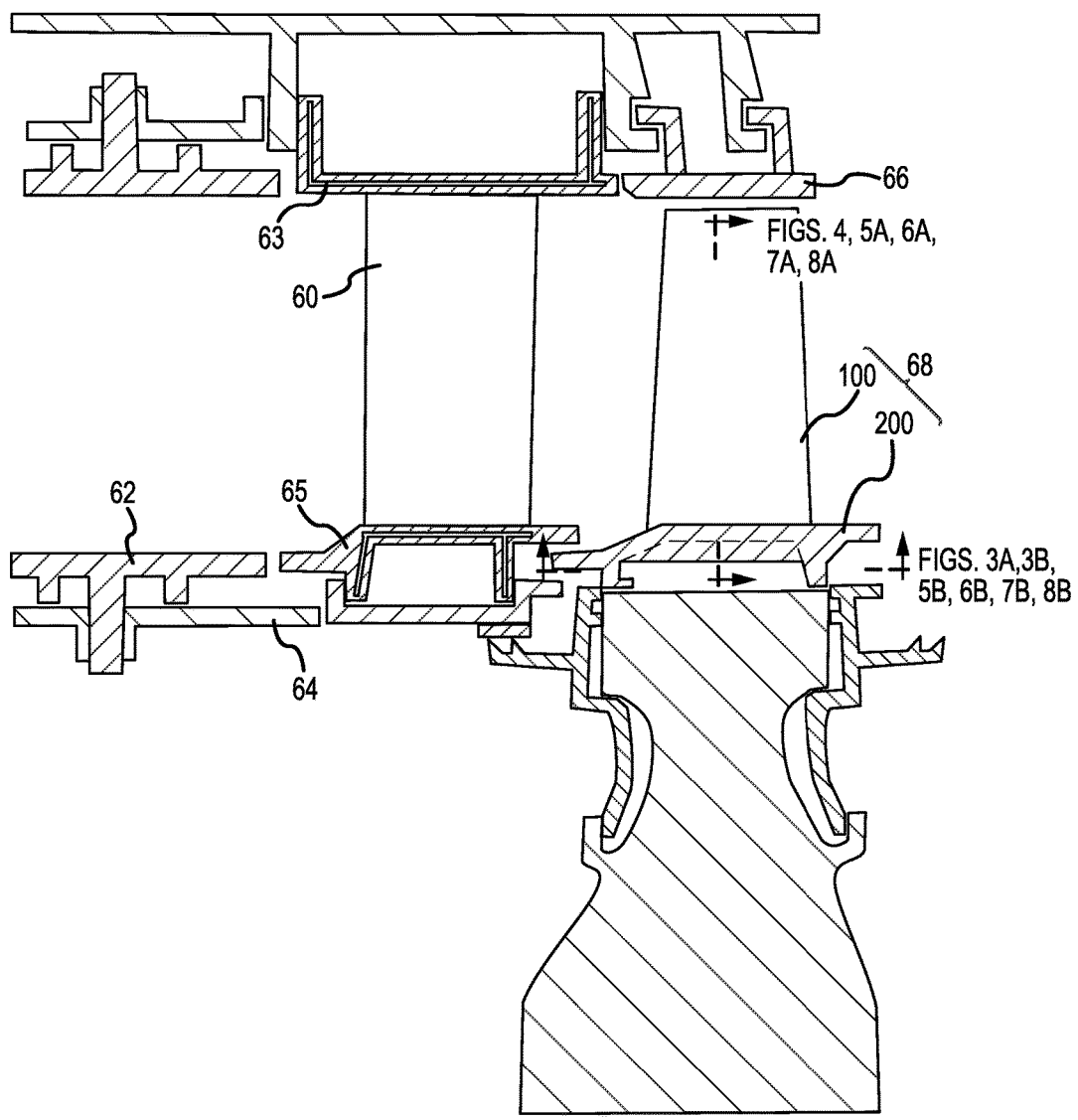
FIG. 2A illustrates example airfoils, such as a rotor blade and a stator vane of an exemplary gas turbine engine, according to various embodiments.

With reference to FIGS. 1 and 2A, an exemplary gas turbine engine 2 is provided. Gas turbine engine 2 is a two-spool turbofan that generally incorporates a fan section 4, a compressor section 6, a combustor section 8 and a turbine section 10. Alternative engines include, for example, an augmentor section among other systems or features. In operation, fan section 4 drives air along a bypass flow-path B while compressor section 6 drives air along a core flow-path C for compression and communication into combustor section 8 then expansion through turbine section 10. Although depicted as a turbofan gas turbine engine 2 herein, it should be understood that the concepts described herein are not limited to use with turbofans as the teachings is applicable to other types of turbine engines including three-spool architectures. A gas turbine engine may comprise an industrial gas turbine (IGT) or a geared aircraft engine, such as a geared turbofan, or non-geared aircraft engine, such as a turbofan, or may comprise any gas turbine engine as desired.

Gas turbine engine 2 generally comprises a low speed spool 12 and a high speed spool 14 mounted for rotation about an engine central longitudinal axis X-X' relative to an engine static structure 16 via several bearing systems 18-1, 18-2, and 18-3. It should be understood that bearing systems is alternatively or additionally provided at locations, including for example, bearing system 18-1, bearing system 18-2, and bearing system 18-3.

Low speed spool 12 generally comprises an inner shaft 20 that interconnects a fan 22, a low pressure compressor section 24, e.g., a first compressor section, and a low pressure turbine section 26, e.g., a second turbine section. Inner shaft 20 is connected to fan 22 through a geared architecture 28 that drives the fan 22 at a lower speed than low speed spool 12. Geared architecture 28 comprises a gear assembly 42 enclosed within a gear housing 44. Gear assembly 42 couples the inner shaft 20 to a rotating fan structure. High speed spool 14 comprises an outer shaft 80 that interconnects a high pressure compressor section 32, e.g., second compressor section, and high pressure turbine section 34, e.g., first turbine section. A combustor 36 is located between high pressure compressor section 32 and high pressure turbine section 34. A mid-turbine frame 38 of engine static structure 16 is located generally between high pressure turbine section 34 and low pressure turbine section 26. Mid-turbine frame 38 supports one or more bearing systems 18, such as 18-3, in turbine section 10. Inner shaft 20 and outer shaft 80 are concentric and rotate via bearing systems 18 about the engine central longitudinal axis X-X', which is collinear with their longitudinal axes. As used herein, a "high pressure" compressor or turbine experiences a higher pressure than a corresponding "low pressure" compressor or turbine.

The core airflow C is compressed by low pressure compressor section 24 then high pressure compressor section 32, mixed and burned with fuel in combustor 36, then expanded over high pressure turbine section 34 and low pressure turbine section 26. Mid-turbine frame 38 includes surface structures 40, which are in the core airflow path. Turbines 26, 34 rotationally drive the respective low speed spool 12 and high speed spool 14 in response to the expansion.

Gas turbine engine 2 is, for example, a high-bypass geared aircraft engine. The bypass ratio of gas turbine engine 2 is optionally greater than about six (6). The bypass ratio of gas turbine engine 2 is optionally greater than ten (10). Geared architecture 28 is an epicyclic gear train, such as a star gear system, e.g., sun gear in meshing engagement with a plurality of star gears supported by a carrier and in meshing engagement with a ring gear, or other gear system. Geared architecture 28 has a gear reduction ratio of greater than about 2.3 and low pressure turbine section 26 has a pressure ratio that is greater than about five (5). The bypass ratio of gas turbine engine 2 is greater than about ten (10:1). The diameter of fan 22 is significantly larger than that of the low pressure compressor section 24, and the low pressure turbine section 26 has a pressure ratio that is greater than about 5:1. Low pressure turbine section 26 pressure ratio is measured prior to inlet of low pressure turbine section 26 as related to the pressure at the outlet of low pressure turbine section 26 prior to an exhaust nozzle. It should be understood, however, that the above parameters are exemplary of a suitable geared architecture engine and that the present disclosure contemplates other turbine engines including direct drive turbofans.

The next generation of turbofan engines is designed for higher efficiency, which is associated with higher pressure ratios and higher temperatures in the high speed spool 14 and other engine sections. These higher operating temperatures and pressure ratios create operating environments that cause thermal loads that are higher than thermal loads conventionally encountered. Operating conditions in high pressure compressor section 32 are often approximately 1400° F. (approximately 760° C.) or more, and operating conditions in combustor 36 are often higher. Moreover, prior arrangements permit regions of localized temperature excursions, such as due to regions that are insufficiently cooled (such as insufficiently convectively cooled) due to the prior cooling structures. Various systems to address these challenges are presented herein.

With reference to FIGS. 1 and 2A, an engine 2 may comprise a rotor blade 68 or a stator vane 60. The engine 2 may comprise various surface structures. For instance, the stator vane 60 may have a surface structure such as an inner stator vane platform 65, or an outer stator vane platform 63. A combustor panel 62 may join a combustor liner 64 and may be a surface structure. Similarly, a blade outer air seal (BOAS) 66 may be a surface structure. Thus, a surface structure as discussed herein may comprise an inner stator vane platform 65, an outer stator vane platform 63, a combustor panel 62, a BOAS 66, and/or another structure as desired. The rotor blade 68 may comprise a blade airfoil section 100 and a platform 200, such as a rotor blade platform. Thus, a surface structure as discussed herein may also include a platform. While various aspects are described herein with reference to such features as the platform 200, and the blade airfoil section 100, such aspects may be incorporated into aspects of the stator vane, and or various structures as desired.

Figure 2B:
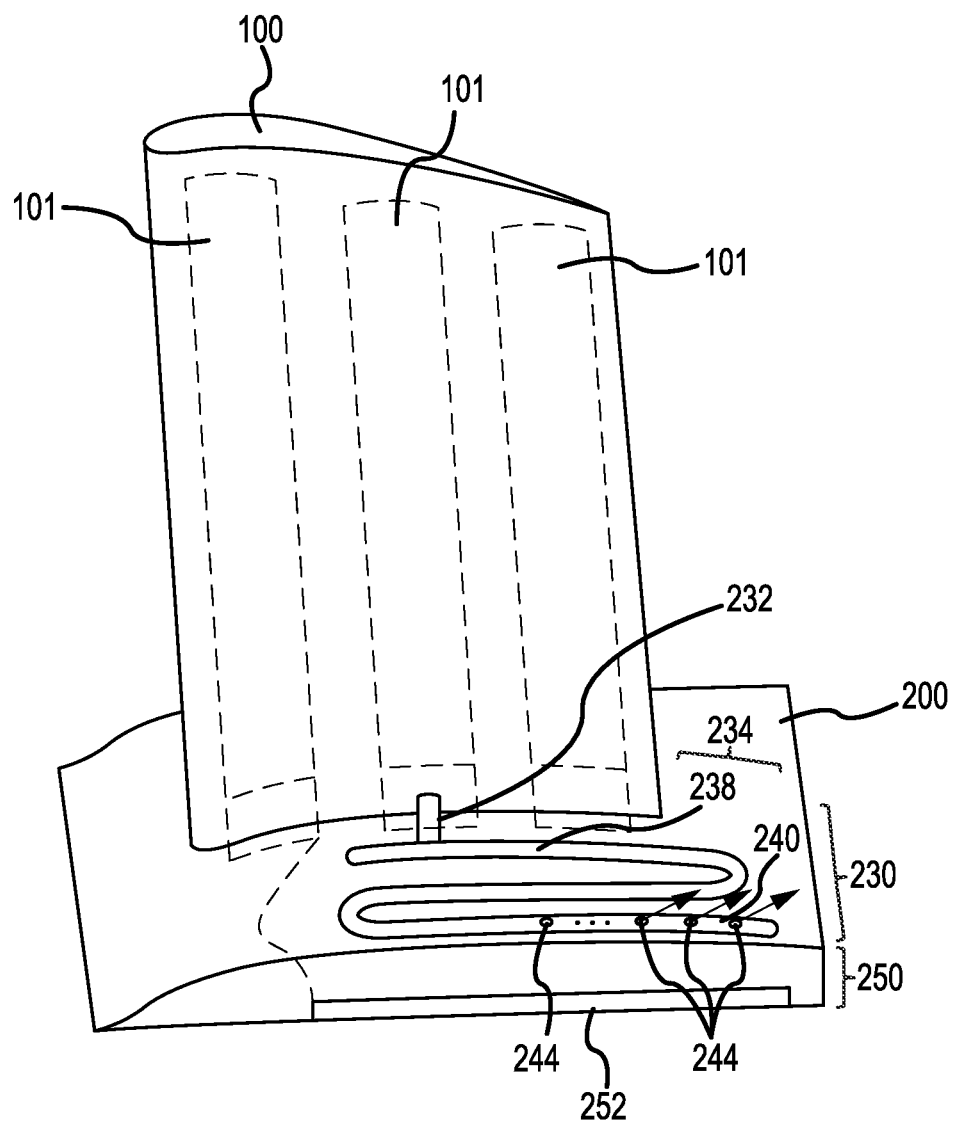
FIG. 2B illustrates an airfoil of FIG. 2A including serpentine platform cooling structures, according to various embodiments.

For example, with reference to FIG. 2B, a blade airfoil section 100 may comprise blade cooling cavities 101. Blade cooling cavities 101 may comprise cavities disposed internally through at least a portion of the blade airfoil section 100 and configured to receive cooling air whereby the blade airfoil section 100 is cooled. The blade cooling cavities 101 may interconnect with an inflow channel 232 of a platform cooling apparatus 230 of a platform 200 as discussed further herein.

A platform 200 may comprise a platform structure disposed inward of the rotor blade 68 (relative to the engine central longitudinal axis X-'X). The platform 200 may comprise a platform cooling apparatus 230. A platform cooling apparatus 230 may comprise one or more channels disposed at least partially through the platform 200 and configured to conduct cooling air whereby the platform 200 is cooled.

The platform 200 may further comprise a cooling cover apparatus 250. The cooling cover apparatus 250 may at least partially enclose (e.g., at least partially fluidically seal) the platform cooling apparatus 230 (such as the one or more channels), whereby heat transfer may be improved, and in various embodiments, further whereby structural support of the platform 200 may be provided.

Figure 3A:
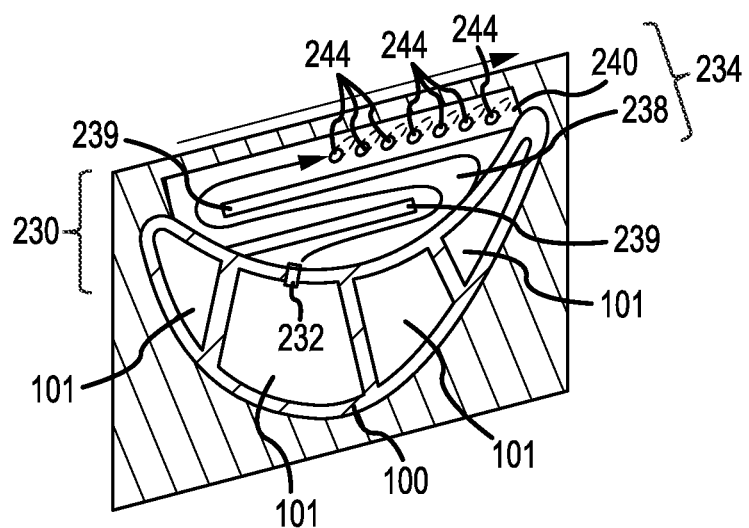
FIG. 3A illustrates an end section view of a rotor blade according to FIG. 2A, according to various embodiments.
Figure 4:
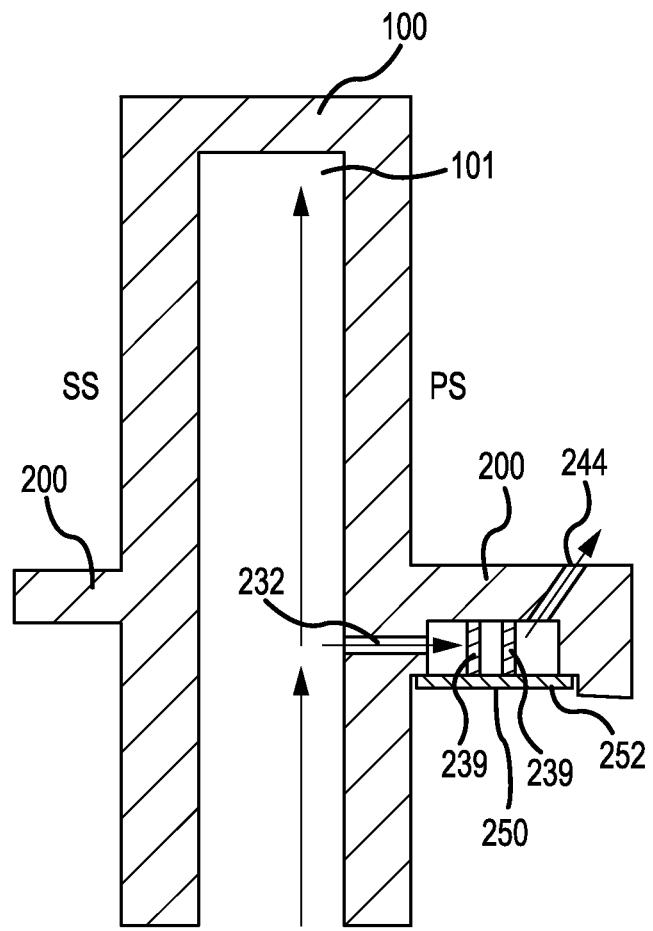
FIG. 4 illustrates a side section view of a rotor blade according to FIG. 2A, according to various embodiments.
Figure 5A:
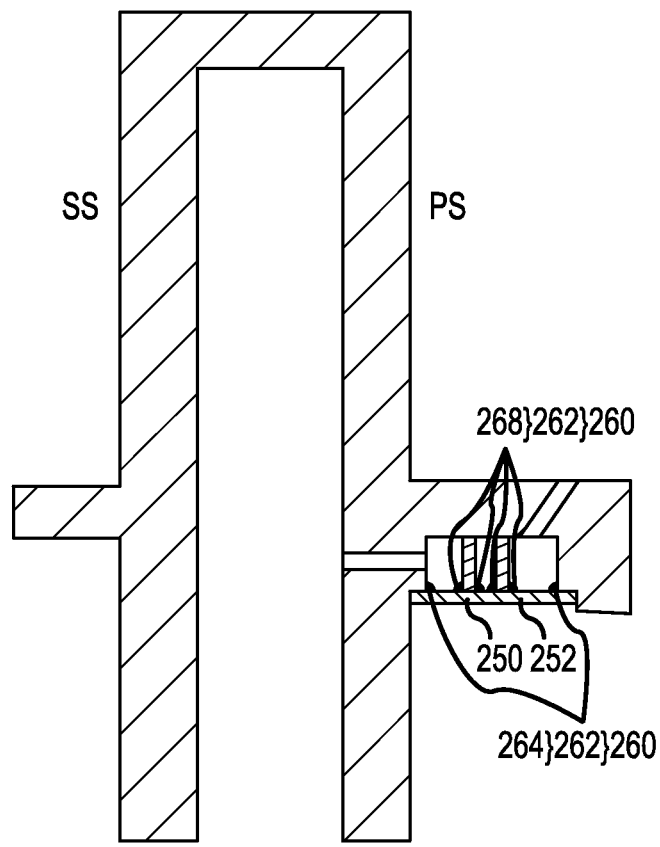
FIG. 5A illustrates a side section view of a rotor blade according to FIG. 2A, having a cover apparatus including a cover plate and a retention mechanism that includes a perimeter weld, according to various embodiments.
Figure 5B:
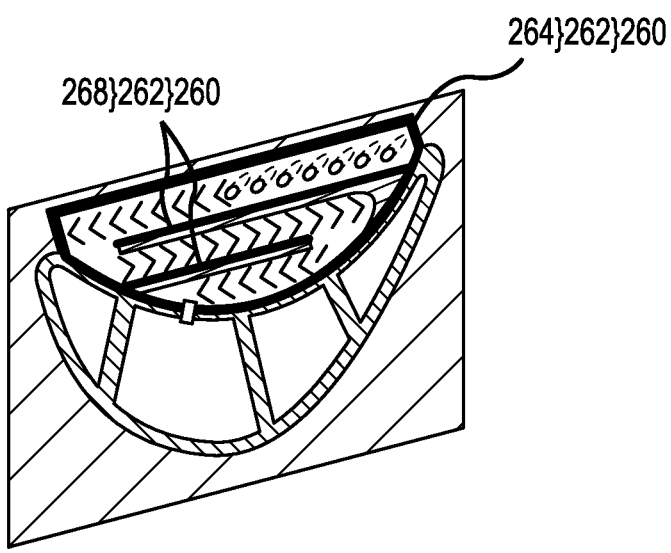
FIG. 5B illustrates an end section view of a rotor blade according to FIG. 2A, having a cover apparatus including a cover plate and a retention mechanism that includes a perimeter weld, according to various embodiments.
Figure 6A:
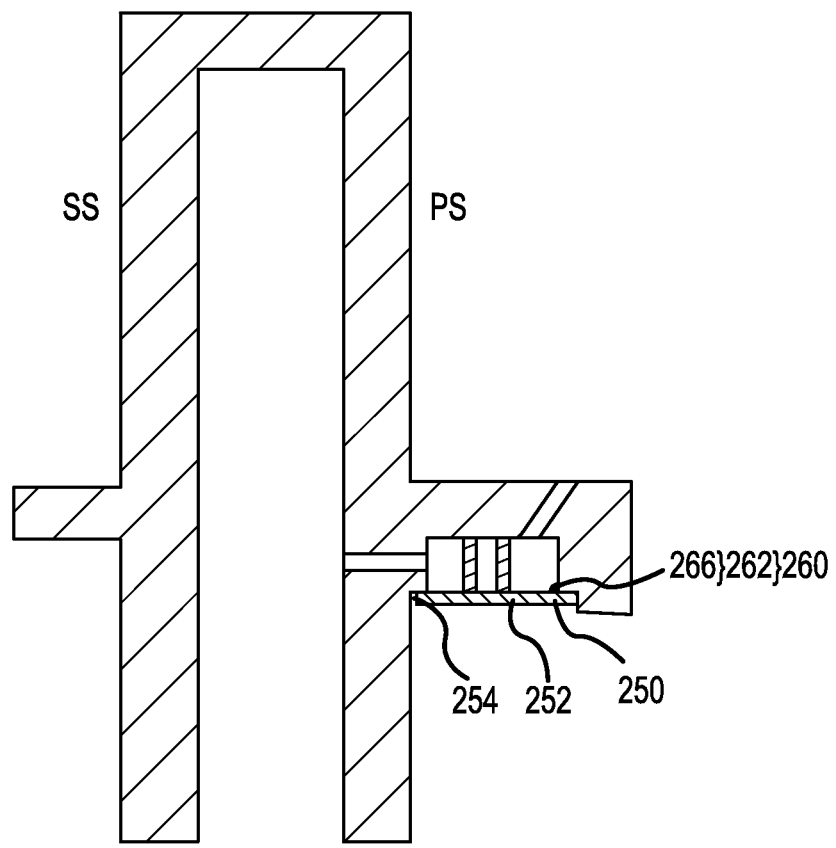
FIG. 6A illustrates a side section view of a rotor blade according to FIG. 2A, having a cover apparatus including a cover plate and a retention mechanism that includes a platform edge weld, according to various embodiments.
Figure 6B:
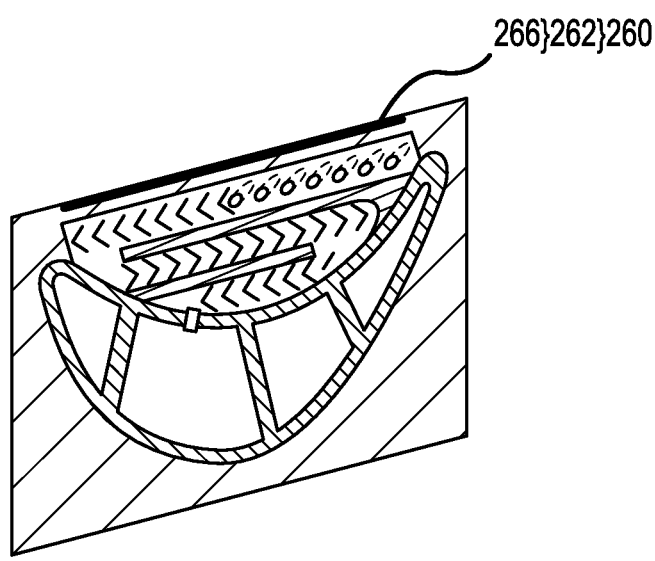
FIG. 6B illustrates an end section view of a rotor blade according to FIG. 2A, having a cover apparatus including a cover plate and a retention mechanism that includes a platform edge weld, according to various embodiments.
Figure 7A:
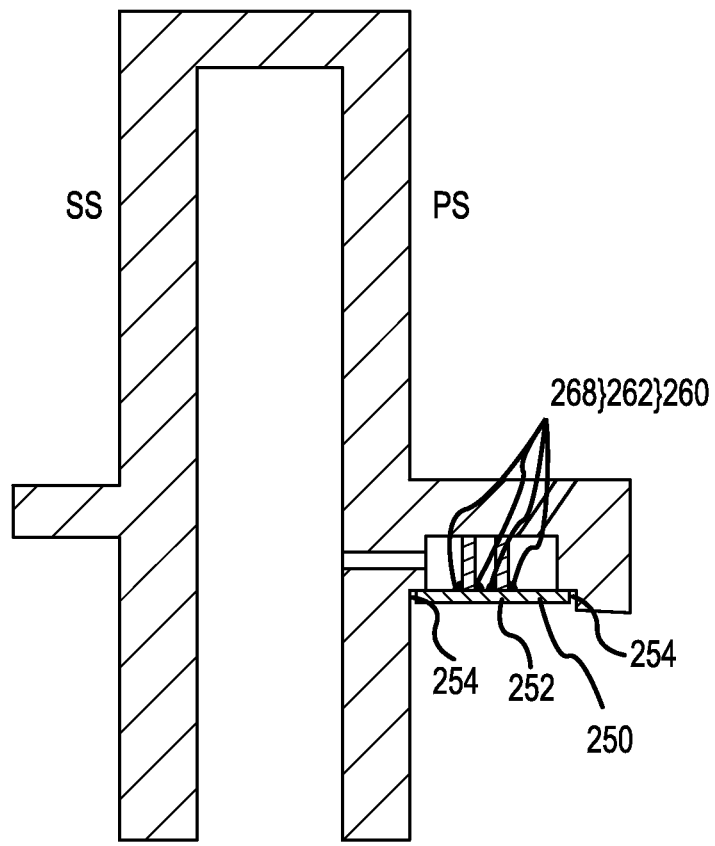
FIG. 7A illustrates a side section view of a rotor blade according to FIG. 2A, having a cover apparatus including a cover plate and a retention mechanism that includes rib welds, according to various embodiments.
Figure 7B:
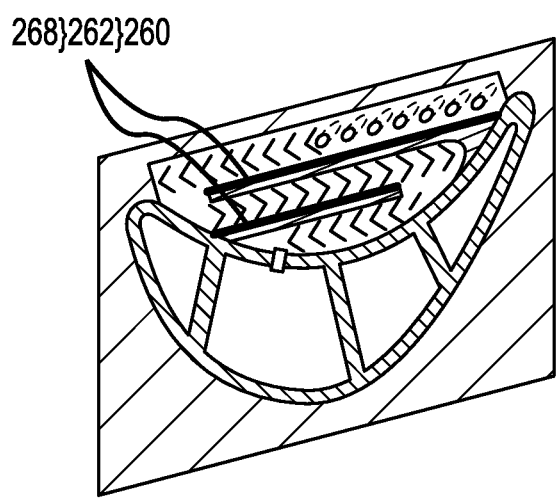
FIG. 7B illustrates an end section view of a rotor blade according to FIG. 2A, having a cover apparatus including a cover plate and a retention mechanism that includes rib welds, according to various embodiments.

With reference to FIGS. 2B, 3A, and 4, the platform cooling apparatus 230 may comprise an inflow channel 232. An inflow channel 232 may comprise a channel disposed through at least a portion of at least one of the platform 200 and the blade airfoil section 100 and in fluidic communication with a blade cooling cavity 101 of the blade airfoil section 100. The inflow channel 232 may receive cooling air from the blade cooling cavity 101 of the blade airfoil section 100 and conduct it to further aspects of the platform cooling apparatus 230, such as, for example a cooling passage 234.

The platform cooling apparatus 230 may comprise a cooling passage 234. A cooling passage 234 may comprise the aforementioned one or more channels disposed at least partially through the platform 200 and configured to conduct cooling air whereby the platform 200 is cooled. The cooling passage 234 may have a variety of arrangements, such as linear, curved, serpentine, irregular, and/or the like.

Figure 3B:
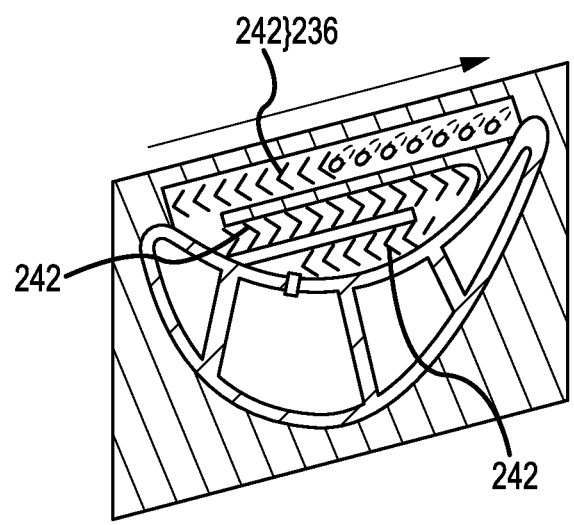
FIG. 3B illustrates an end section view of a rotor blade according to FIG. 2A further depicting heat transfer enhancement features of the rotor blade, according to various embodiments.

With momentary reference to FIG. 3B, the platform cooling apparatus 230 may further comprise heat transfer enhancement features 236. For example, heat transfer enhancement features 236 may comprise pedestals, and/or trip strips 242, and/or further structures within the channels of the platform cooling apparatus 230 whereby at least one of convective and conductive heat transfer among the cooling air passing through the channels and the surrounding structure of the platform 200 may be enhanced.

With renewed reference to FIGS. 2B, 3A, and 4, the platform cooling apparatus 230 may further comprise outflow apertures 244. The platform cooling apparatus 230 may comprise one or more, or any number of outflow apertures 244. An outflow aperture 244 comprises an orifice extending in fluidic communication between a channel of the platform cooling apparatus 230 and through at least a portion of the platform 200 and in fluidic communication with a surrounding ambient environment immediately proximate to a surface of the platform 200. In this manner, cooling air may flow into a cooling passage 234 from an inflow channel 232, may transit through the cooling passage 234, and may exit the cooling passage 234 via one or more outflow apertures 244.

With reference to FIGS. 2B, 4, 5A-B, 6A-B, and 7A-B, a cooling cover apparatus 250 may comprise a cover plate 252. A cover plate 252 may comprise a plate structure configured to at least partially enclose (e.g., at least partially fluidically seal) the platform cooling apparatus 230 (such as the one or more channel), whereby heat transfer may be improved, and in various embodiments, further whereby structural support of the platform 200 may be provided. The cover plate 252 may be disposed radially inward (relative to the engine central longitudinal axis X-X') of the platform cooling apparatus 230. In this manner, centrifugal loading such as during engine operation, may tend to promote retention of the cover plate 252 in proper position.

With reference to FIGS. 2B, 6A, 7A, and 8B, a cooling cover apparatus 250 may further comprise a defined gap 254. A defined gap 254 may comprise an opening between the cover plate 252 and the platform 200, whereby cooling air may escape from the cooling passage 234. A defined gap 254 may comprise a gap configured to accommodate materials with different coefficients of thermal expansion, such as to ameliorate buckling of components, or may comprise a gap configured to accommodate a calibrated leak whereby cooling air may escape from the cooling passage 234 in order to enhance heat transfer between the platform 200 and the cooling air.

Figure 8A:
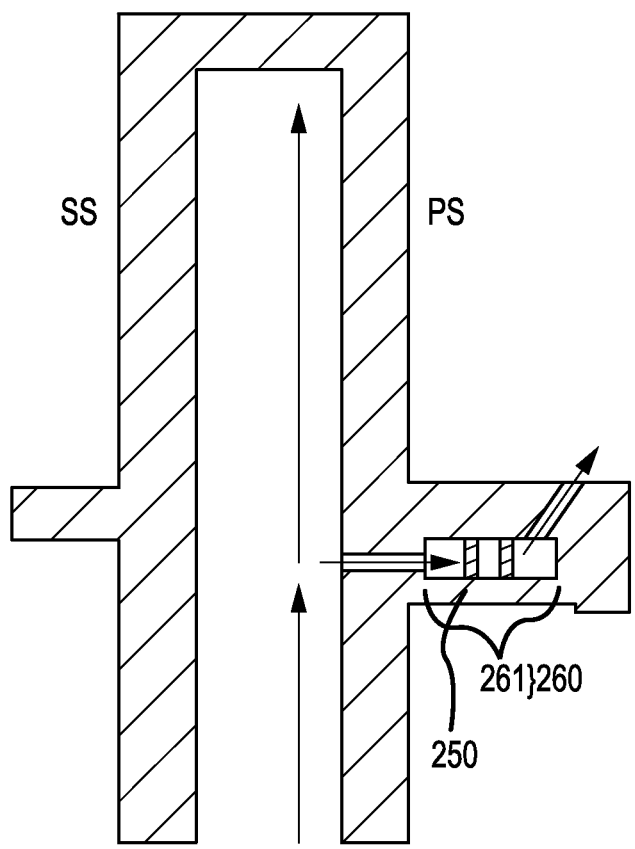
FIG. 8A illustrates a side section view of a rotor blade according to FIG. 2A, having a cover apparatus including a cover plate and a retention mechanism that includes integral formation of the cover plate, according to various embodiments.
Figure 8B:
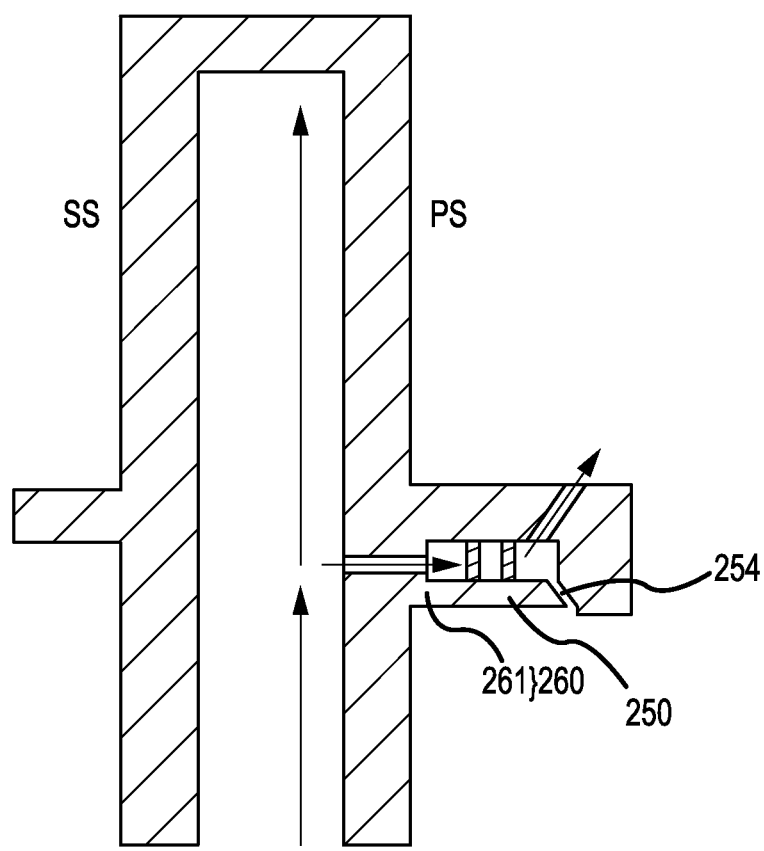
FIG. 8B illustrates an end section view of a rotor blade according to FIG. 2A, having a cover apparatus including a cover plate and a retention mechanism that includes integral formation of the cover plate, according to various embodiments.

With reference to FIGS. 5A-B, 6A-B, 7A-B, and 8A-B, the cooling cover apparatus 250 may further comprise a retention mechanism 260. A retention mechanism 260 may comprise any structure configured to at least partially retain the cooling cover apparatus 250 in mechanical communication with the platform 200 proximate to the cooling passage 234. In various embodiments, the retention mechanism 260 may comprise an integral formation 261, such as the integral joining of the cooling cover apparatus 250 to the platform 200, as seen in FIGS. 8A-B. In further embodiments, the retention mechanism 260 may comprise one or more welds 262 connecting the cover plate 252 to the platform 200, as seen in FIGS. 5A-7B.

With reference now to FIGS. 2B and 3A, and with renewed focus on the cooling passage 234, a cooling passage 234 may have various portions. For instance, a cooling passage 234 may comprise a serpentine portion 238, a terminal portion 240 and one or more ribs 239.

A serpentine portion 238 may comprise a channel extending at least partially through the platform 200 and configured to receive cooling air from an inflow channel 232 and convey it in thermodynamic communication with the platform 200. The serpentine portion 238 may comprise one or more turns. For instance, the serpentine portion 238 may comprise about 180-degree turns, whereby the serpentine portion 238 folds back on itself, separated from the adjacent portion of cooling passage 234 by one or more ribs 239. In various embodiments, the serpentine portion 238 comprises a first 180-degree turn in a first angular direction, then a second 180-degree turn in the opposite angular direct (e.g., clockwise then counterclockwise or counterclockwise then clockwise). Thus, it may be said that the serpentine portion 238 comprises a first plurality of parallel folded channels. In various embodiments, three or more 180-degree turns, or any number of 180-degree turns are included. In further embodiments, turns of different amounts are included, such as to cause the serpentine portion 238 to adopt a spiral path, or concentric trapezoidal path, or any path as desired. The one or more ribs 239 are disposed between adjacent portions of the path (e.g., between each of the parallel folded channels) to prevent merger of the channels.

A terminal portion 240 may comprise a channel extending partially through the platform 200 and configured to receive cooling air from the serpentine portion 238 and convey it in thermodynamic communication, such as convective communication, with the platform 200. The terminal portion 240 may comprise the end of the cooling passage 234, forming the terminus of the channel. Moreover, the terminal portion 240 may comprise structures configured to release the cooling air following its passage through the cooling passage 234. For example, the platform cooling apparatus 230 may comprise outflow apertures 244 disposed through the terminal portion 240. For instance, outflow apertures 244 may comprise cooling holes (e.g., film holes) disposed through the platform 200 and connecting the interior space of the cooling passage 234, and particularly, the terminal portion 240 of the cooling passage 234 in fluidic communication with a surrounding ambient environment immediately proximate to a surface of the platform 200. In this manner, the cooling air may be released from the terminal portion 240 of the cooling passage 234 following its passage through the cooling passage 234.

With reference now to FIGS. 5A-B, 6A-B, and 7A-B, and with renewed focus on the retention mechanism 260 comprising welds 262, various configurations may be contemplated. For instance, a weld 262 may comprise a perimeter weld 264, a platform edge weld 266, and/or a rib weld 268. In various embodiments, a weld 262 comprises a perimeter weld 264. A perimeter weld 264 may comprise a weld extending around all edges of the cover plate 252. A perimeter weld 264 may be configured to prevent air leakage around the edges of the cover plate 252. The perimeter weld 624 may thus, in conjunction with the cover plate 252 enclose the platform cooling apparatus 230 to prevent air leakage, and may also enhance the strength of the platform 200 due to the extent of the weld all around the edges of the cover plate 252.

In various embodiments, a weld 262 may comprise a platform edge weld 266. A platform edge weld 266 may comprise a weld extending along a single edge of the cover plate 252. A platform edge weld 266 may thus, retain the cover plate 252 in position substantially enclosing the platform cooling apparatus 230, but may also permit air leakage around the edges that are not welded, for example, such as to form a defined gap 254, and/or to ameliorate stress from thermal growth mismatch between the cover plate 252 and the platform 200.

Furthermore, a weld 262 may comprise a rib weld 268. A rib weld 268 may comprise a weld extending along a rib 239 of the platform cooling apparatus 230 and joining the rib 239 to the cover plate 252. In various embodiments, one rib weld 268 may extend along a rib 239. In further embodiments, such as wherein more than one rib 239 exists, rib welds 268 may extend along each rib 239. In this manner, the cover plate 252 may be retained in position substantially enclosing the platform cooling apparatus 230, but may also permit air leakage around the edges that are not welded, for example, such as to form a defined gap 254, and/or to ameliorate stress from thermal growth mismatch between the cover plate 252 and the platform 200.

With reference to FIGS. 1-8B, having discussed aspects of a platform 200, a platform 200 may be made of various materials. For instance, a platform 200 may be made of a single material, or different materials, or combinations of materials. For example, components of the system are made from metal. For example, aspects of a platform 200 are metal, such as nickel, cobalt, molybdenum, titanium, aluminum, steel, or stainless steel, though it alternatively comprises numerous other materials configured to provide support. Components of the system are optionally made from other materials such as, for example, composite, ceramic, plastics, polymers, alloys, glass, binder, epoxy, polyester, acrylic, or any material or combination of materials having desired material properties, such as heat tolerance, strength, stiffness, or weight. Portions of a platform 200 as disclosed herein are optionally made of different materials or combinations of materials, and/or comprise coatings. Moreover, components of the platform 200 are in some instances mixtures of different materials according to different ratios, gradients, and the like.

A platform 200 thus has multiple materials, or any material configuration suitable to enhance or reinforce the resiliency and/or support of the system when subjected to wear in an aircraft operating environment or to satisfy other desired electromagnetic, chemical, physical, or material properties, for example coefficient of thermal expansion, ductility, weight, flexibility, strength, or heat tolerance.

One such material is an austenitic nickel-chromium-based alloy such as Inconel®, which is available from Special Metals Corporation of New Hartford, N.Y., USA. Other such material includes ceramic matrix composite (CMC). Further material includes refractory metal, for example, an alloy of titanium, such as, titanium-zirconium-molybdenum (TZM).

Various benefits and advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A platform comprising:
   a platform cooling apparatus comprising a cooling passage comprising a channel disposed at least partially through the platform and configured to conduct cooling air,
   wherein the cooling passage comprises a serpentine portion comprising a first plurality of folded channels comprising at least one turn;
   wherein the platform cooling apparatus further comprises an outflow aperture comprising an orifice extending in fluidic communication between the cooling passage of the platform cooling apparatus and through at least a portion of the platform and in fluidic communication with a surrounding ambient environment immediately proximate to a surface of the rotor blade;
   a cooling cover apparatus at least partially fluidically sealing the platform cooling apparatus; and
   a defined gap comprising an opening between the cooling cover apparatus and the platform
   whereby the cooling air may escape from the cooling passage.

2. The platform according to claim 1, wherein the platform cooling apparatus further comprises:
   an inflow channel configured to receive the cooling air from a cooling cavity of an airfoil section and convey it to the cooling passage.

3. The platform according to claim 2, further comprising heat transfer enhancement features disposed within the cooling passage.

4. The platform according to claim 1, wherein the folded channels comprise parallel folded channels and wherein the at least one turn comprises a 180-degree turn.

5. The platform according to claim 2, further comprising a rib disposed between the folded channels.

6. The platform according to claim 5, wherein the cooling passage further comprises a terminal portion comprising an end of the cooling passage forming a terminus of the cooling passage.

7. The platform according to claim 6, wherein the platform cooling apparatus further comprises outflow apertures disposed through the terminal portion of the cooling passage and connecting the cooling passage in fluidic communication with a surrounding ambient environment immediately proximate to a surface of the platform.

8. The platform according to claim 5, further comprising a retention mechanism to retain the cooling cover apparatus in mechanical communication with the platform proximate to the platform cooling apparatus.

9. The platform according to claim 8, wherein the retention mechanism comprises an integral formation comprising an integral joining of the cooling cover apparatus to the platform.

10. The platform according to claim 8, wherein the cooling cover apparatus comprises a cover plate comprising a plate structure disposed radially inward of the platform cooling apparatus and configured to at least partially fluidically seal the platform cooling apparatus.

11. The platform according to claim 10, wherein the retention mechanism comprises a weld.

12. The platform according to claim 11, wherein the weld comprises a perimeter weld comprising welding extending around all edges of the cover plate.

13. The platform according to claim 11, wherein the weld comprises a platform edge weld comprising welding extending along a single edge of the cover plate.

14. The platform according to claim 11,
wherein the weld comprises a rib weld comprising welding extending along the rib of the platform cooling apparatus and joining the rib to the cover plate.

15. A rotor blade comprising:
a blade airfoil section comprising a cooling cavity; and
a platform comprising:
a platform cooling apparatus comprising a cooling passage comprising a channel disposed at least partially through the platform and comprising an inflow channel in fluidic communication with the cooling cavity and the cooling passage;
wherein the cooling passage further comprises an outflow aperture comprising an orifice extending in fluidic communication between the cooling passage of the platform cooling apparatus and through at least a portion of the platform and in fluidic communication with a surrounding ambient environment immediately proximate to a surface of the rotor blade;
a cooling cover apparatus at least partially fluidically sealing the platform cooling apparatus; and
a defined gap comprising an opening between the cooling cover apparatus and the platform whereby the cooling air may escape from the cooling passage.

16. A rotor blade according to claim 15, wherein the platform further comprises heat transfer enhancement features disposed within the cooling passage.

17. A method of forming a platform comprising:
forming a platform cooling apparatus comprising a cooling passage comprising a channel disposed at least partially through the platform and configured to conduct cooling air,
wherein the cooling passage comprises a serpentine portion comprising a first plurality of folded channels comprising at least one turn;
wherein the cooling passage further comprises an outflow aperture comprising an orifice extending in fluidic communication between the cooling passage of the platform cooling apparatus and through at least a portion of the platform and in fluidic communication with a surrounding ambient environment immediately proximate to a surface of the rotor blade; and
forming a cooling cover apparatus at least partially fluidically sealing the platform cooling apparatus, wherein the cooling cover apparatus at least partially defines a gap comprising an opening between the cooling cover apparatus and the platform whereby the cooling air may escape from the cooling passage.

* * * * *